United States Patent [19]
Yoshida

[11] Patent Number: 6,079,694
[45] Date of Patent: Jun. 27, 2000

[54] FLUID PRESSURE DEVICE

[75] Inventor: Toshiyuki Yoshida, Nishinomiya, Japan

[73] Assignee: Kawasaki Jukogyo Kabushiki Kaisha, Hyogo, Japan

[21] Appl. No.: 09/281,668

[22] Filed: Mar. 30, 1999

[30] Foreign Application Priority Data

Mar. 31, 1998 [JP] Japan .................................. 10-087286

[51] Int. Cl.$^7$ .............................. F15B 13/02; F16K 3/24; F16K 39/04
[52] U.S. Cl. ...................... 251/282; 251/324; 137/625.69
[58] Field of Search ................................... 251/282, 324; 137/625.69

[56] References Cited

U.S. PATENT DOCUMENTS

| | | | |
|---|---|---|---|
| 3,260,501 | 7/1966 | Raymond | 251/324 |
| 3,762,443 | 10/1973 | Sorenson | 251/324 |
| 4,651,776 | 3/1987 | Nakano et al. | 137/625.69 |

FOREIGN PATENT DOCUMENTS 50-75590 12/1976 Japan .
54-69431 5/1979 Japan .

OTHER PUBLICATIONS

Japanese article—Hydraulics and Pneumatics Handbook—Edited by Japan Hydraulics and Pneumatics Academy.

*Primary Examiner*—Kevin Shaver
*Assistant Examiner*—John P. Welsh
*Attorney, Agent, or Firm*—Marshall, O'Toole, Gerstein, Murray & Borun

[57] ABSTRACT

The fluid pressure device includes a valve housing 2 in which a spool hole 14 is formed, and a spool 18 having a first spool portion 22 inserted in the spool hole 14, and the spool portion 22 is movable with respect to the first hole portion 26 of the spool hole 14 in its axial direction. More fluid grooves 110 are formed in the first spool portion 22. Pressurized fluid acting on one side of the fluid groove 110 have pressure higher than that of pressurized fluid acting on the other sides of the fluid groove 110. A first gap between an outer peripheral surface of the one side of the seal portion and an inner peripheral surface of the first hole 26 between the adjacent fluid groove 110 is set slightly greater than a second gap between an outer peripheral surface of the other side of the seal portion and the inner peripheral surface of the first hole.

2 Claims, 3 Drawing Sheets

FLUID PRESSURE DEVICE

BACKGROUND OF THE INVENTION

1. Field of the Invention

The present invention relates to a fluid pressure device such as a flow control valve for controlling a supply amount of pressurized fluid.

2. Description of the Related Art

A control valve as one example of the fluid pressure device includes a valve housing, and a spool movably mounted in the valve housing, as well as an introducing hole and a discharging hole both formed in the valve housing. The spool is provided with a cylindrical spool portion, the valve housing is formed with a cylindrical hole, and the spool portion is movably inserted in the cylindrical hole in its axial direction. In such a control valve, if the spool is moved, the introducing hole and the discharging hole are brought into communication as desired, thereby discharging pressurized fluid, e.g., pressurized oil from the introducing hole outside from the discharging hole.

In the case of this kind of control valve, a fluid groove is formed in an outer peripheral surface of the spool portion. The fluid groove is formed into a ring-like shape, and one or more fluid grooves are provided in the axial direction of the spool portion. By providing the fluid grooves in this manner, the pressurized fluid held in the fluid grooves substantially uniformly act on the entire region of the spool portion in its peripheral direction so that the pressure of the pressurized fluid acting in the peripheral direction can be uniformed.

When the plurality of fluid grooves are provided in the spool portion in this manner, if the spool portion of the spool is located concentrically with the cylindrical hole of the valve housing, an annular gap is generated between an outer peripheral surface of the spool portion and an inner peripheral surface of the cylindrical hole, and the pressurized fluid flows through the annular gap. Therefore, substantially uniform fluid pressure acts on the spool portion in its peripheral direction. However, if the spool portion is deviated toward the inner side of the cylindrical hole, and a part of the spool portion contacts with the cylindrical hole, and if only a side of the spool portion on which the pressurized fluid is acting due to uneven manufacturing precision or inclination of the spool portion, the fluid pressure does not act on a side of the spool portion which receives lower pressure, and the part of the spool portion is pushed against the inner peripheral surface of the cylindrical hole. When such a contacting state is generated, a great force is required to move the spool portion, and it is difficult to smoothly move the spool.

Such a problem exists in general fluid pressure devices in which the cylindrical spool portion is movably inserted into the cylindrical hole of the housing.

In a fluid pressure device having no fluid groove, it is generally known to increase the size of the gap of the shaft seal portion receiving high pressure. However, when this is constituted only by the seal portion, if the shaft is moved in its axial direction, the initially set relation of gap is changed, there are problems that a sufficient sealing performance can not be obtained, a sufficient force for keeping the shaft concentrically, and the like.

It is an object of the present invention, to provide a fluid pressure device in which a cylindrical spool portion of a shaft member is concentrically held in a cylindrical hole of a housing, and the cylindrical spool portion can be moved smoothly.

SUMMARY OF THE INVENTION

According to the present invention, there is provided a fluid pressure device, comprising a housing formed with a cylindrical hole, and a shaft member having a cylindrical spool portion inserted in the cylindrical hole, the cylindrical spool portion being movable in the cylindrical hole in its axial direction, pressure of a pressurized fluid acting on a first side portion of the cylindrical spool portion being higher than that of a pressurized fluid acting on a second side portion of the spool portion separated from the first side portion in its axial direction, and a gap seal being provided between the first side portion and the second side portion, wherein the gap seal is provided with a plurality of seal portions by forming one or more fluid grooves for substantially equalizing a distribution of fluid pressure in a circumferential direction in the cylindrical spool portion, and in at least one of the plurality of seal portions, a first gap between an outer peripheral surface of the first portion side and an inner peripheral surface of the cylindrical hole is set slightly greater than a second gap between an outer peripheral surface of the second portion side and the inner peripheral surface of the cylindrical hole.

According to the present invention, the gap seal is provided between the first side portion and the second side portion of the cylindrical spool portion, and the gap seal is provided with the plurality of seal portion by forming one or more fluid grooves. In at least one of the plurality of seal portions, a first gap between an outer peripheral surface of the first portion side and an inner peripheral surface of the cylindrical hole is set slightly greater than a second gap between an outer peripheral surface of the second portion side and the inner peripheral surface of the cylindrical hole. Therefore, if the cylindrical spool portion is relatively moved in its radial direction with respect to the cylindrical hole, the pressurized fluid existing in the seal portion acts on the spool portion such as to return the latter to its original position, i.e., acts such as to hold the spool portion and the cylindrical hole concentrically. Further, even if the second portion side of the cylindrical portion contacts with the inner peripheral surface of the cylindrical hole, a first gap exists between an outer peripheral surface of the first portion of the cylindrical spool portion and an inner peripheral surface of the cylindrical hole in at least one seal, and the pressurized fluid in the first gap acts such as to hold the cylindrical spool portion concentric with the cylindrical hole. Therefore, a great frictional force is not generated even if the cylindrical spool portion contacts with the inner peripheral surface of the cylindrical hole, and it is possible to smoothly move the seal portions of the shaft member in the axial direction.

Further, according to the present invention, the housing is a valve housing formed with a cylindrical hole, the shaft member is a spool for controlling to open and close a fluid flow passage formed in the valve housing, and the cylindrical spool portion is a spool portion provided in the spool and movably inserted in the cylindrical hole in its axial direction.

The present invention can be suitably applied to a fluid pressure device in which a spool is movably inserted in a valve housing, e.g., a control valve.

DESCRIPTION OF THE PREFERRED EMBODIMENTS

Figure 1:
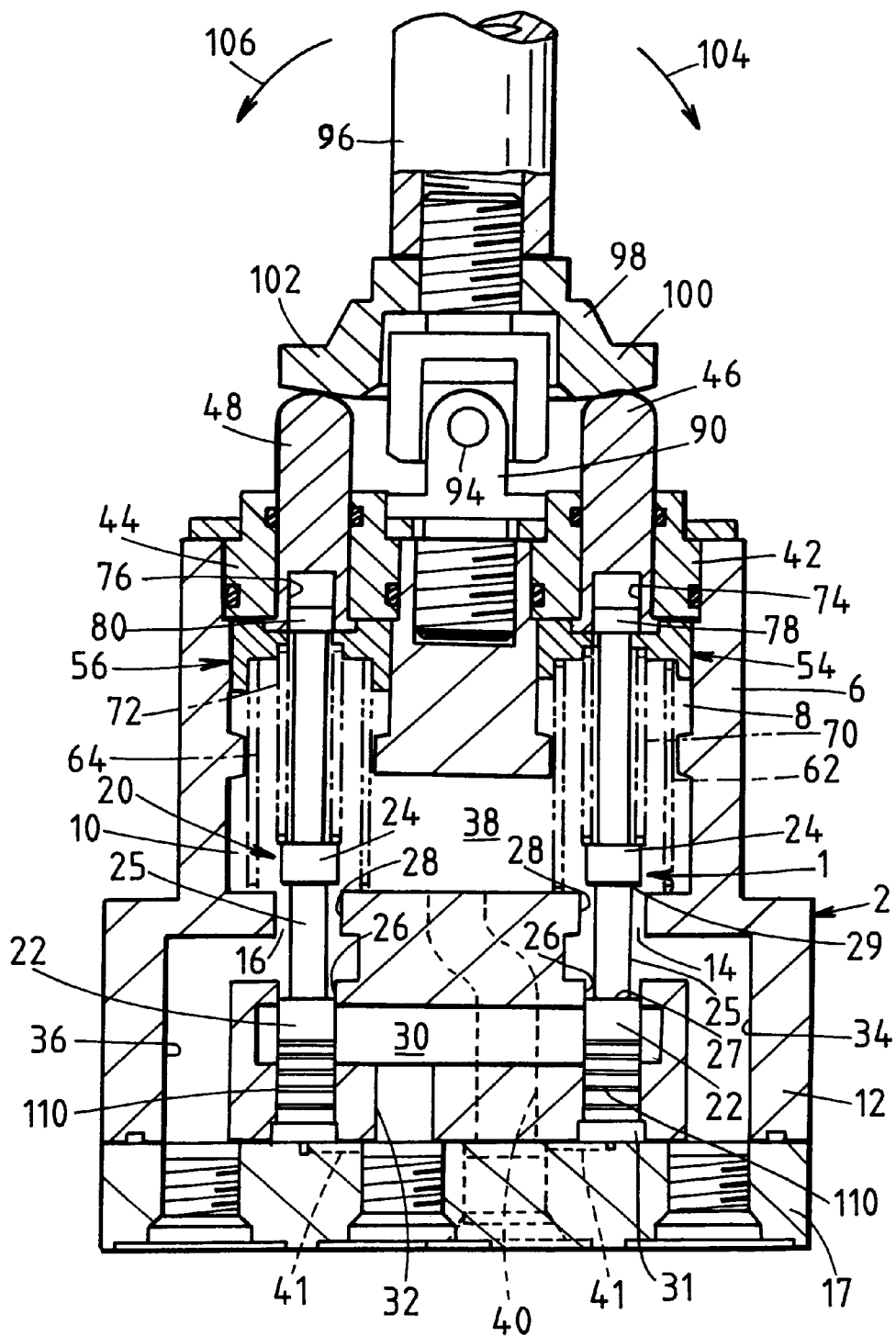
FIG. 1 is a sectional view showing an embodiment of a control valve as one example of a fluid pressure device according to the present invention.
Figure 2:
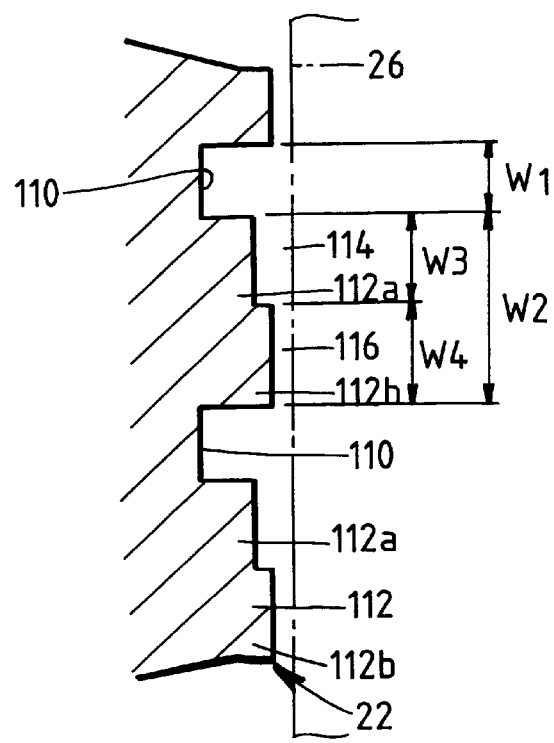
FIG. 2 is an enlarged sectional view of a portion of a first spool portion of a spool in the control valve shown in FIG. 1.

An embodiment of a fluid pressure device according to the present invention will be explained below with reference to the accompanying drawings. FIG. 1 is a sectional view showing an embodiment of a point control valve as one example of the fluid pressure device according to the present invention, and FIG. 2 is an enlarged sectional view of a portion of a spool portion of a pilot control valve shown in FIG. 1.

In FIG. 1, the shown pilot control valve includes a valve housing 2. The valve housing 2 is provided at its upper portion 6 with a pair of spring chambers 8 and 10 leaving a distance therebetween in the lateral direction, and is provided at its lower portion 12 with spool holes 14 and 16 corresponding to the spring chambers 8 and 10. The spool holes 14 and 16 are formed circle in section, and upper ends of the spool holes 14 and 16 communicate with the spring chambers 8 and 10. The valve housing 2 further includes a cover portion 17 mounted to a lower portion 12. Lower ends of the spool holes 14, 16 are occluded with the cover portion 17.

Spools 18 and 20 as shaft members are vertically movably mounted in the spool holes 14 and 16. The spools 18 and 20 have substantially the same structures, and one of the structures will be explained. The spool 18 (20) is provided at its lower end with a first spool portion 22, and at its intermediate portion with a second spool portion 24. An annular notch groove 25 is formed between the first spool portion 22 and second spool portion 24. An annular surface of the first spool portion 22 (upper surface in FIG. 1) and an annular surface of the second spool portion 24 (lower surface in FIG. 1) function as pressure receiving portions on which pressurized fluid acts. In the present embodiment, an outer diameter of the second spool portion 24 is set greater than that of the first spool portion 22. Therefore, a pressure receiving area of a pressure receiving portion 29 of the second spool portion 24 is greater than that of a pressure receiving area of a pressure receiving portion 27 of the first spool portion 22. The spool hole 14 (16) includes a first hole portion 26 having an inner diameter corresponding to the outer diameter of the first spool portion 22 (which forms a cylindrical hole), and a second hole portion 28 having an inner diameter corresponding to the outer diameter of the second spool portion 24. The inner diameter of the second hole portion 28 is set greater than that of the first hole portion 26. The first spool portion 22 of the spool 18 (20) is slidably supported by the first hole portion 26 of the spool hole 14 (16) so that spool 18 (20) is guided by the first hole portion 26 and is moved in the vertical direction. The second spool portion 24 is slidably received in the second hole portion 28 of the spool hole 14 (16) by the vertical movement of the spool 18 (20), and the second spool portion 24 is guided in the second hole portion 28. The first spool portion 22 and the structure related to the first spool portion 22 will be described later.

By mounting the spool 18 (20) in this manner, a fluid chamber 31 is formed at outer side of a lower end of the spool 18 (20), i.e., at a bottom of the first hole portion 26 of the spool hole 14 (16), and the pressurized fluid in the fluid chamber 31 acts on the entire lower end surface of the spool 18 (20). The other ends of the spools 18 and 20 upward extend to the spring chambers 8 and 10.

In the present embodiment, the valve body 2 is provided at its lower portion 12 with a first chamber 30 as a pressure port. The first chamber 30 communicates with the first hole portion 26 of the spool holes 14 and 16. The first chamber 30 is connected to a fluid supply source (not shown) such as a fluid pump through a primary pressure side flow passage 32 provided in the valve body 2. Pressurized fluid such as pressurized oil as hydraulic fluid is supplied from the fluid supply source to the first chamber 30 through the primary pressure side flow passage 32.

The valve body 2 is provided at its lower portion 12 with secondary pressure side flow passages 34 and 36 which are controlled in a switching manner by the spools 18 and 20. The one secondary pressure side flow passage 34 is provided with respect to the spool hole 14, and is connected between the first and second hole portions 26 and 28 of the spool hole 14. The secondary pressure side flow passage 34 is connected to a spool control pilot port of a control valve (not shown) for example. The other secondary pressure side flow passage 36 is provided with respect to the spool hole 16, and is connected between the first and second hole portions 26 and 28 of the spool hole 16. The secondary pressure side flow passage 36 is connected to a spool control opposite pilot port of the control valve for example.

A second chamber 38 as a tank port is provided at substantially central portion of the upper portion 6 of the valve body 2. The second chamber 38 communicates with the spring chambers 8 and 10. The second chamber 38 is in communication with the fluid tank through a drain flow passage 40 formed in the lower portion 12 of the valve body 2, and pressurized fluid in the second chamber 38 is returned to the fluid tank through the drain flow passage 40.

The fluid chamber 31 at the lower end of the spool holes 14 and 16 is in communication with the drain flow passage 40 through a throttle flow passage 41. Therefore pressurized fluid in the fluid chamber 31 is also returned to a fluid tank (not shown) through the drain flow passage 40.

Cylindrical plug members 42 and 44 are disposed on upper ends of the spring chambers 8 and 10. Rod holes are formed in the plug members 42 and 44 such as to pass therethrough, and push rods 46 and 48 are vertically movably inserted in the rod holes.

Upper ends of the push rods 46 and 48 project upward from the plug members 42 and 44. Lower ends of the push rods 46 and 48 project from the plug members 42 and 44 to the spring chambers 8 and 10.

Spring retaining members 54 and 56 are vertically (as viewed in FIG. 1) movably accommodated in the spring chambers 8 and 10. The spring receiving members 54 and 56 are cylindrically shaped, flanged recesses are formed at their lower end surface. First spring members 62 and 64 are interposed between the flanged recesses and a portion of the valve body 2. The first spring members 62 and 64 comprise coil springs, and resiliently bias the spring receiving members 54 and 56 upward toward the push rods 46 and 48 as viewed in FIG. 1, so that the spring receiving members 54 and 56 are held at positions (positions shown in FIG. 1) abutting against the push rods 46 and 48.

The spring receiving members 54 and 56 are provided with inner recesses inside the flanged recesses. Second spring members 70 and 72 are interposed between the second spool portions 24 of the spools 18 and 20 and the inner recesses. The second spring members 70 and 72 comprise coil springs, and are disposed inside the first spring members 62 and 64. Lower ends of the push rods 46 and 48 are formed with accommodating recesses 74 and 76 corresponding to the spools 18 and 20. Heads 78 and 80 of the upper ends of the spools 18 and 20 are movably accommodated in the accommodating recesses 74 and 76 through holes formed in the spring receiving members 54 and 56.

With this structure, the second spring members 70 and 72 act on the spool 18 and 20, and resiliently bias the spool 18 and 20 downward as viewed in FIG. 1, i.e., in a direction moving away from the push rods 46 and 48. With this operation, the heads 78 and 80 abut against the upper surfaces of the spring receiving members 54 and 56 and therefore, the spools 18 and 20 are held at non-operational position shown in FIG. 1. When the spools 18 and 20 are at the non-operational position, the first spool portion 22 is located in the first hole portion 26 of the spool holes 14 and 16 to cut off the communication between the first chamber 30 and the secondary pressure side flow passages 34 and 36, so that the pressurized fluid in the first chamber 30 should not flow into the secondary pressure side flow passages 34 and 36. At that time, the second spool portions 24 of the spools 18 and 20 are located in the spring chambers 8 and 10, and the second chamber 38 and the secondary pressure side flow passages 34 and 36 are brought into communication with each other through the notch groove 25 of the spools 18 and 20, and the pressurized fluid in the secondary pressure side flow passages 34 and 36 flows in the second chamber 38.

A mounting member 90 is threadedly mounted to a central portion of the upper portion 6 of the valve body 2. A pin 94 is mounted to an upper end of the mounting member 90, and a lower end of an operation lever 96 is connected to the mounting member 90 through the pin 94 such that the operation lever 96 can turn rotatably in the lateral direction as shown in FIG. 1. A pushing member 98 is threadedly mounted to the lower end of the operation lever 96, and the pushing member 98 includes operation portions 100 and 102 corresponding to the push rods 46 and 48.

In the above-described pilot valve, when the operation lever 96 is located at the neutral position shown in FIG. 1, the push rods 46 and 48 are held at the projecting positions by action of the first spring members 62 and 64, and the spools 18 and 20 are held at the non-operational positions by action of the second spring members 70 and 72. Therefore, the communication between the first chamber 30 and the secondary pressure side flow passages 34 and 36 is cut off by the first spool portions 22 of the spools 18 and 20, but the second chamber 38 and the secondary pressure side flow passages 34 and 36 are brought into communication through the notch groove 25 of the spools 18 and 20, the spool control pilot ports of the control valves (not shown) are brought into communication with the fluid tank (not shown) through the second chamber 38 of the secondary pressure side flow passages 34 and 36 and the drain flow passage 40, and the spools of the control valves are held at neutral positions.

If the operation lever 96 is turned rightward as shown by arrows 104 (106) from the neutral position, the operation portion 100 (102) of the push member 98 pushes the push rod 46 (48) to move the push rod 46 (48) and the spring receiving member 54 (56) downward against the resilient biasing force of the first spring member 62 (64). As the spring receiving member 54 (56) is moved, the spool 18 (20) is moved downward by the action of the second spring member 70 (72).

When the spool 18 (20) is moved downward, the first chamber 30 and the secondary pressure side flow passage 34 (36) are brought into communication through the notch groove 25 of the spool 18 (20). Therefore, the pressurized fluid from the fluid supply source (not shown) is supplied to the pilot port of one (the other) for spool control of the control valves through the first chamber 30 and the secondary pressure side flow passage 34 (36), and the spool (not shown) of the control valve is moved from the neutral position to a predetermined direction (opposite direction from the predetermined direction) by the pressurized fluid from the fluid supply source (not shown). In this pilot control valve, the fluid chamber 31 is in communication with the drain flow passage 40 through the throttle flow passage 41. The outer diameter of the first spool portion 22 is set smaller than that of the second spool portion 24, and the pressure receiving area of the first spool portion 22 is smaller than that of the second spool portion 24. Therefore, the pressurized fluid supplied to the second pressure side flow passage 34 (36) acts in a direction pushing the spool 18 (20) upward by a force generated by the difference between the pressure receiving areas.

Therefore, the spool 18 (20) is held at a position in which the operation force of the operation lever 96, i.e., the push down force by the second spring member 70 (72) and the push up force by the pressurized oil of the secondary pressure side flow passage 34 (36) are balanced.

Next, the first spool portion 22 of the spool 18 (20) and its structure will be explained with reference to FIGS. 1 and 2. Mainly referring to FIG. 2, in the present embodiment, the spool portion 22 comprises the cylindrical spool portion, and the first hole portion 26 of the spool hole 14 comprises the cylindrical hole. An upper end side portion of the spool portion 22 acts as a first side portion to which the pressurized fluid from the fluid supply source acts, and a lower end side portion of the spool portion 22 acts as a second side portion to which the pressurized fluid flowing to the drain flow passage 40 acts. A plurality of fluid grooves 110 are provided at a distance from one another in the axial direction (vertical direction in FIGS. 1 and 2) between the first and the second side portions. Each of the fluid grooves 110 is formed annularly in the first spool portion 22, a plurality of seal portions 112 are formed between the adjacent fluid grooves 110. The plurality of seal portions 112 constitute gap seals between the first and second side portions of the spool portion 22. The pitch of each of more fluid grooves 110 is set to be about 1.0 to 5.0 mm. If the pitch of the fluid groove 110 is set to be about 1.5 mm, the width W1 of the fluid groove 110 in the axial direction is set to be about 0.1 to 0.5 mm, and the width W2 of the seal portion 112 in the axial direction is set to be about 1.0 to 1.4 mm.

In the present embodiment, the pressurized fluid from the fluid supply source (not shown) is supplied to the first chamber 30, and the fluid chamber 31 is in communication with the drain flow passage 40. Therefore, the pressure of the pressurized fluid acting on the upper end of the first spool portion 22 is greater than the pressure of the pressurized fluid acting on the lower end of the first spool portion 22. Related to this situation, the present embodiment has the following structure. That is, an outer diameter of an upstream portion 112*a* (a side portion of the first portion to which the highly pressurized fluid acts) of each of the seal portions 112 of the first spool portion 22 is set slightly smaller than an outer diameter of a downstream portion 112*b* (a side portion of the second portion to which the low pressurized fluid acts), and a gap 114 between an outer peripheral surface of the upstream portion 112a and an inner peripheral surface of the first hole portion 26 is set slightly greater than a gap 116 between an outer peripheral surface of the downstream portion 112b and an inner peripheral surface of the first hole portion 26. Width W3 and width W4 of the upstream portion 112a and the downstream portion 112b are set substantially the same. A difference between the outer diameter of the upstream portion 112a and the outer diameter of the downstream portion 112b can be set to be about 0.001 to 0.02 mm (about 1.5 times of a difference between the diameter of the spool portion 22 and that of the first hole portion 26). If the difference between the outer diameters becomes smaller than 0.001, the difference between the outer diameters of the upstream portion 112a and the downstream portion 112b is substantially equal to zero if the manufacturing precision is taken into account, and the seal portion 112 can function as a single seal member practically. If the difference between the outer diameters exceeds 0.02 mm, the upstream portion 112a functions as the fluid groove 110.

Figure 3:
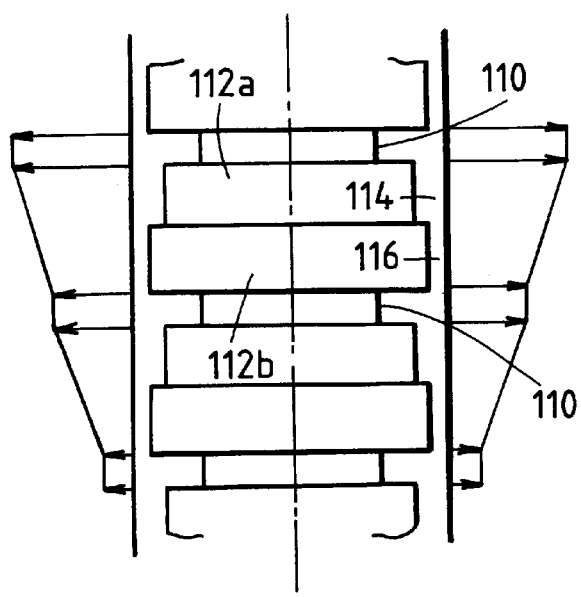
FIG. 3 is a view for explaining pressure characteristics of pressurized fluid in a state in which the first spool portion and a first hole portion are concentrically held.
Figure 4:
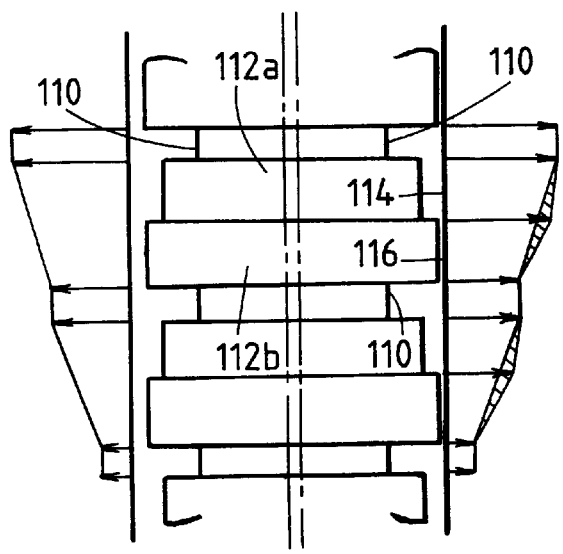
FIG. 4 is a view showing pressure characteristics of pressurized fluid when the first spool portion is relatively moved rightward with the first hole portion.

Since each of the seal portions 112 of the first spool portion 22 is structured as described above, the pressure characteristics of the pressurized fluid acting on these seal portions 112 are as shown in FIG. 3. That is, since the upper side of the first spool portion 22 is brought into communication with the first chamber 30, and the lower side of the first spool portion 22 is brought into communication with the fluid chamber 31, the pressure of the pressurized fluid in the fluid groove 110 is increased as approaching the upstream, and is reduced as approaching the downstream. In this state, the center axis of the first spool portion 22 and the center axis of the first hole portion 26 are coaxially positioned, pressure distribution in circumferential direction of the fluid pressure acting on the first spool portion 22 is substantially uniform, and a force for moving the first spool portion 22 in its diametrical direction does not act. From such a state, if the first spool portion 22 is relatively moved rightward as shown in FIG. 3, the pressure characteristics of the pressurized fluid acting on the seal portion 112 is changed as shown in FIG. 4. That is, if the first spool portion 22 is relatively moved rightward, as shown in FIG. 4, the pressure of the pressurized fluid acting from the right side of the first spool portion 22 is increased, and the pressure portion which is approximately shown by the shaded portions in FIG. 4 is increased. Whereas, the fluid pressure acting from the left side of the first spool portion 22 is not changed approximately.

As a result, the first spool portion 22 is moved leftward as viewed in FIG. 4 so that the first spool portion 22 is prevented from contacting with an inner surface of the first hole portion 26 and therefore, frictional resistance when the first spool portion 22 is moved in the axial direction can be reduced.

If the seal portion 112 of the first spool portion 22 is structure as described above, even if the first spool portion 22 contacts with the inner peripheral surface of the first hole portion 26 of the valve housing 2, the portion that is contacted is the downstream 112b of each of the seal portions 112, and the upstream portion 112a does not contact with the inner peripheral surface of the first hole portion 26. Therefore, the pressurized fluid existing in a first gap 114 between the upstream portion 112a of each of the seal portions 112 and the inner peripheral surface of the first hole portion 26 acts on the first spool portion 22, and the pressurized fluid acts such as to hold the first spool portion 22 concentrically with the first hole portion 26. Therefore, the force pushing the first spool portion 22 toward the inner peripheral surface of the first hole portion 26 is weakened, and the first spool portion 22 can be moved smoothly in the axial direction along the first hole portion 26.

Figure 5:
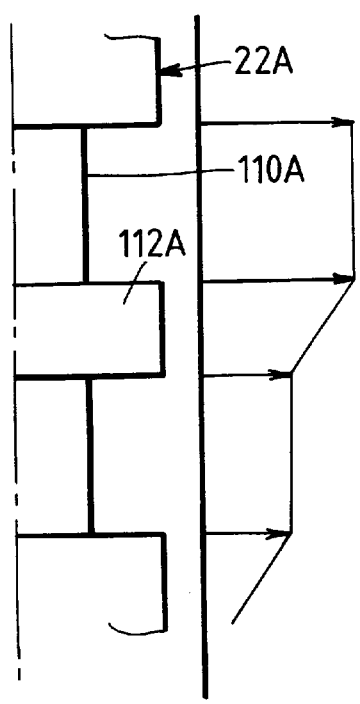
FIG. 5 is a view for explaining pressure characteristics of pressurized fluid acting on a first spool portion of conventional prior art structure.

When fluid grooves 110A are formed in a first spool portion 22A, and seal portion 112A each having substantially constant outer diameter in the axial direction is formed (in the case of a conventional prior art control valve), the pressure characteristics of the pressurized fluid acting on the first spool portion 22A are as shown in FIG. 5. That is, the pressure of the pressurized fluid in the seal portion 112A is gradually reduced from the upper fluid groove 110A toward the lower fluid groove 110A. In this case, if the first spool portion 22A contacts with an inner peripheral surface of a first hole portion of a valve housing, the pressurized fluid does not exists between the contacted portions. Therefore, the pressurized fluid existing at the opposite side from the contacting portions acts such as to further push the first spool portion 22A toward the inner peripheral surface of the first hole portion, and a great force is required for moving the first spool portion 22 in the axial direction.

Although the embodiment of the control valve as one example of the fluid pressure device according to the present invention has been described above, the present invention should not be limited to this embodiment, and it is possible to variously change or modify the embodiment without departing from the scope of the present invention.

For example, although the first spool portion 22 is provided with the plurality of fluid grooves 110, and the structure related to these fluid grooves is employed in the above embodiment, the present invention should not be limited to this only, and the present invention can also be applied to a structure in which a single fluid groove is provided and the seal portion is formed.

Further, for example, although the upstream portion and the downstream portion of each of the seal portions formed by providing the fluid groove has slightly different outer diameter in the above-described embodiment, it is unnecessary that all of the seal portions have such a structure, but if at least one of the seal portions is formed in this manner, a desired effect can be obtained.

Furthermore, for example, although the upstream portion 112a of the seal portion 112 is formed in the cylindrical shape, and its outer diameter is substantially equal in the axial direction in the above embodiment, the upstream portion 112a can be tapered such that its outer diameter is gradually increased toward the downstream portion.

Further, for example, although the above embodiment has been explained based on the pilot control valve, the present invention should not be limited to this only, and the present invention can also be applied to other fluid pressure device such as a flow rate control valve which controls the flow rate by movement of a spool, and a pressure reducing valve which reduces the pressure of pressurized fluid to a predetermined pressure.

What is claimed is:

1. A fluid pressure device, comprising a housing formed with a cylindrical hole, and a shaft member having a cylindrical spool portion inserted in said cylindrical hole, said cylindrical spool portion being movable in said cylindrical hole in its axial direction, pressure of a pressurized fluid acting on a first side portion of said cylindrical spool portion being higher than that of a pressurized fluid acting on a second side portion of said spool portion separated from said first side portion in its axial direction, and a gap seal being provided between said first side portion and said second side portion, wherein said gap seal is provided with a plurality of seal portions by forming one or more fluid grooves for substantially equalizing a distribution of fluid pressure in a circumferential direction in said cylindrical spool portion, and in at least one of said plurality of seal portions, a first gap between an outer peripheral surface of said first portion side and an inner peripheral surface of said cylindrical hole is set slightly greater than a second gap between an outer peripheral surface of said second portion side and said inner peripheral surface of said cylindrical hole.

2. A fluid pressure device according to claim 1, wherein said housing is a valve housing formed with a cylindrical hole, said shaft member is a spool for controlling the opening and closing of a fluid flow passage formed in said valve housing, and said cylindrical spool portion is a spool portion provided in said spool and movably inserted in said cylindrical hole in its axial direction.

* * * * *